Oct. 13, 1959     F. W. RUIJS     2,908,210
EXPOSURE APPARATUS
Filed Sept. 20, 1954
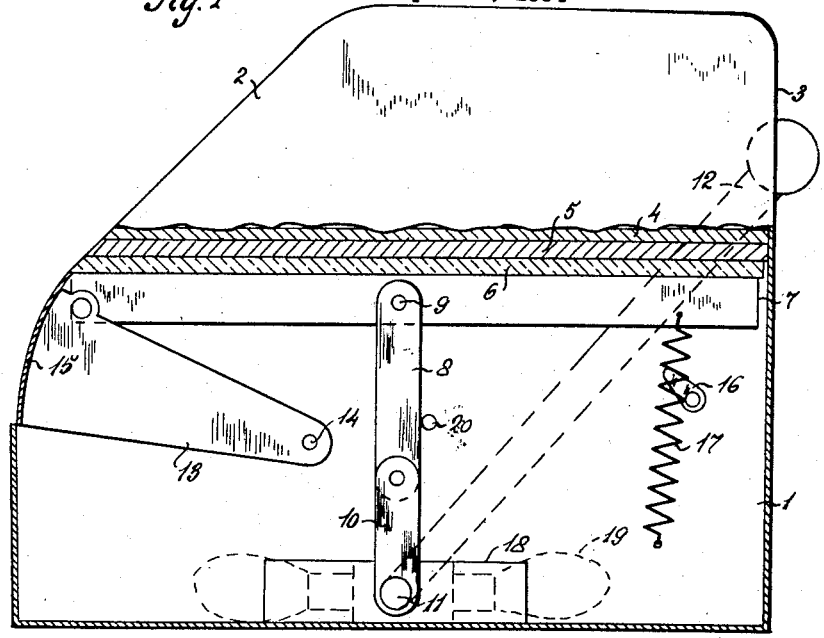
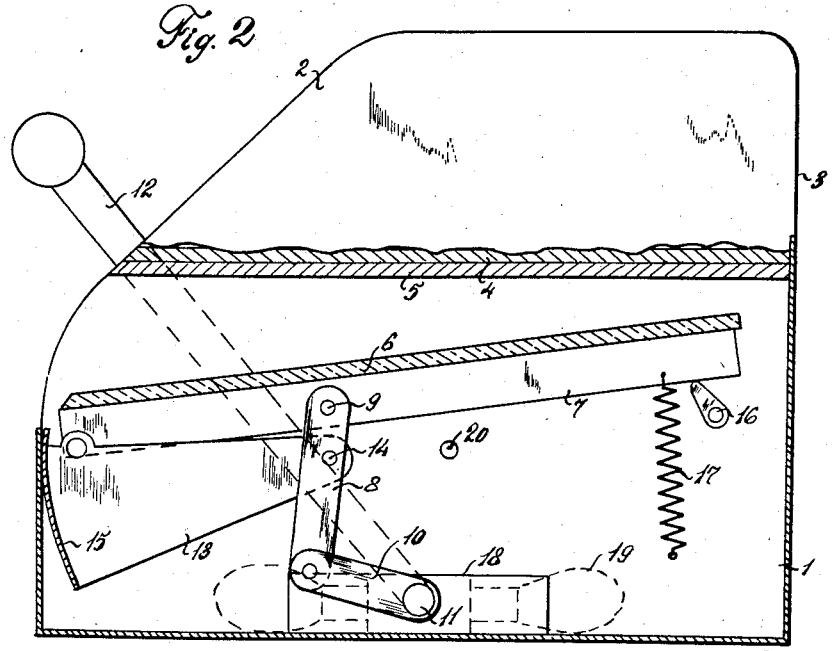
Inventor
Frans W. Ruijs
by Stevens, Davis, Miller & Mosher
his attorneys United States Patent Office 2,908,210
Patented Oct. 13, 1959

2,908,210

EXPOSURE APPARATUS

Frans W. Ruijs, Utrecht, Netherlands, assignor to A. B. Dick Company, Niles, Ill., a corporation of Illinois Application September 20, 1954, Serial No. 457,166

Claims priority, application Netherlands September 24, 1953

7 Claims. (Cl. 95—73)

This invention relates to an exposure apparatus comprising a housing in which one or more sources of light are arranged, as well as a frame serving to support the original to be copied and the sensitive sheet. Said exposure apparatus is especially suitable for contact printing, although it may also be used with advantage for photocopying.

The exposure apparatus according to the invention is characterized in that it is provided with such a driving mechanism that the frame or like object and/or the wall(s) of the housing cooperating therewith are capable of adjusting themselves automatically in the end position independent of the initial position, and moreover are capable of assuming intermediate positions substantially parallel to the end position. The frame and/or the wall(s) of the housing cooperating therewith can move completely free from each other, the frame assuming its end position or an intermediate position dependent on the thickness of the original, which may be a sheet as well as a bundle of sheets, a book, etc., the original being pressed uniformly against the wall cooperating therewith. The frame may be formed by or may be provided with a transparent plate of glass, artificial resin or other transparent material.

According to the invention the driving mechanism may be so constructed that at both sides of the frame and/or the wall cooperating therewith two rods hingedly connected at their ends are provided, the one free end thereof being pivotally connected with the frame or the wall cooperating therewith and the other free end being provided on an actuating shaft.

Preferably the one free end of each of the rod systems is connected to substantially the middle of the frame and/or the wall cooperating therewith. According to the invention a spring may be provided at one of the sides of the frame and/or the wall(s) cooperating therewith, which springs try to keep said ends of the sides separate from each other against the action of the driving mechanism. Due to this the one free end of the frame or the wall will first come into contact with the wall cooperating therewith or the frame, whereas at the further operation of the driving mechanism the other free end of the wall is pressed against the wall cooperating therewith or the frame. According to the invention the distance over which said free side of the frame or the wall may move may be adjusted by providing an abutment adjustable in height.

The side of the frame and/or the wall cooperating therewith lying opposite said free side of the frame or the wall may according to the invention be provided with a guiding means attaining thereby that said frame and/or wall will always assume one and the same end position.

According to the invention the or each guiding means may consist of a plate or rod connected with the frame and/or the wall cooperating therewith the plate or rod being rotatably mounted in the house. In this arrangement a part of the adjacent wall of the housing may be connected to said side.

To be able to adjust the pressure of the frame and the wall(s) cooperating therewith in the desired manner the driving mechanism according to the invention may be so constructed that the axis or axes of rotation for the rod systems are adjustably mounted in the housing. It is obvious that also the frame itself and/or the wall cooperating therewith could be provided in an adjustable manner in the housing.

According to the invention the or each source of light may be fixed to the frame and/or the movable wall(s). In this manner the distance of said source(s) of light to the frame remains always the same independent of the position of the frame during exposure, said position being determined by the thickness of the original to be copied, e.g. a book, so that no variation in the time of exposure will be necessary to obtain good prints.

A preferred embodiment of the exposure apparatus according to the invention is characterized in that it is so constructed that the driving mechanism also switches-in the exposure apparatus.

The invention will be illustrated with reference to the drawing in which by way of example an embodiment of the exposure apparatus according to the invention is shown.

Fig. 1 shows the apparatus partly in side view and partly in section in the position in which the frame is pressed against the underside of the upper wall of the house.

Fig. 2 shows the apparatus in the same manner and in the position whereby an original and a sensitive sheet may be introduced into the apparatus.

The apparatus shown in the drawing comprises a housing 1 on the upper surface of which a developing apparatus 2 is mounted. Said developing apparatus does not form part of the invention and will not be further described here. The housing 3 of said developing apparatus may form a unity with the housing 1 of the exposure apparatus.

An elastic pad 5 of sponge rubber, cellular rubber or light elastic material lies against the upper wall of the housing 1, which wall is executed at a partition 4. With said elastic pad a transparent plate 6 of glass, artificial resin or other artificial material cooperates, the plate being carried by a frame 7.

At both sides of the frame 7 the end of a rod or strip 8 is pivotal around a pin 9. To the other end of the rod or strip 1 the one end of a second rod or strip 10 is rotatably connected. The other end of said rod or strip 10 is rigidly connected to a shaft 11 which is rotatably mounted and may be turned by hand with the aid of an operating handle 12.

At both sides of the frame 7 a strip 13 is attached at the left side of the exposure apparatus (see drawing), which side forms the front side of the apparatus. The strip 13 is rotatably mounted at 14 in the housing 1. Said strips are connected at the front side of the apparatus by a plate 15 forming a movable part of the front wall of the housing.

At the right side of the housing 1 forming the backside of the apparatus an abutment 16 is provided serving as a rest for the frame 7 in the position in which the original and the sensitive sheet may be moved in and out of the apparatus, the abutment 16 being adjustable so that the frame in said position may have any desired slope. Said abutment may even be so, that the frame may take a horizontal position or a position sloping to the back. At both sides of said side of the frame 7 a spring is connected with one end to said frame and with the other end to the housing 1. Said springs try to keep the backside of the frame against the abutment 16.

The above may also be obtained by displacing the point 9 of rotation of the rod or strip 8 in the drawing to the left. In this manner the frame 7 is no longer supported in the middle so that the right portion of the frame 7 is heavier than the left portion and due to this tends to rotate downwards.

The shaft 11 is adjustably mounted in supports 18 so that the pressure at which the transparent plate 6 presses against the pressure cushion 5 may be adjusted.

With reference 19 a number of lamps are indicated being fixed on the bottom plate.

In Fig. 1 the end position of the frame 7 and the actuating mechanism is shown, whereas the position of said frame and said mechanism in which the original to be printed and the sensitive sheet may be moved into or moved out of the apparatus is shown in Fig. 2. In the latter position the frame 7 lies altogether at a distance from the pressure cushion 5. Due to this the original to be printed may not only consist of a sheet but may also be formed e.g. by a bundle of sheets or a book.

After the original and the sensitive sheet are brought into the apparatus the frame 7 may be brought in the end position or pressure position by means of the operating rod 12. The front side of the frame will then first move upwards since the back side of said frame is kept downwards by means of the spring 17 or by means of its own weight. After the front side of the frame has reached the pressure cushion 5 the backside of the frame is pressed against the cushion 5. Due to said sequence of pressing it is prevented that the transparent plate which is moved also a few centimeters to the back by said upward movement moves along the rubber plate 5. The latter movement would also cause the sheets being present to shift. When the rods or strips 8, 10 are aligned they come in touch with an operating means 20 of a time switch (not shown) so that the light sources 19 are switched-in during the adjusted period.

In case a book is laid on the glass plate 6 as original instead of a sheet with the abutment 16 in a downward position, the front side of the frame 7 will move so far upwardly till the upper side of the book touches the pressure cushion 5. After this the back side of the frame moves also upwardly so that the back side of the book comes into contact with the pressure cushion 5 and automatically a uniform pressure over the total pressure surface of the book is obtained. From this it appears that independent of the thickness of the original always a good pressing-on thereof and of the sensitive sheet is obtained. The abutment 16 could therefore be constructed as a rigid abutment and be provided at such a distance of the pressure cushion 5 as corresponds with the largest admissible thickness of the original to be copied. It is, however, preferred to provide an adjustable abutment since herewith the frame at the front obtains a larger slope on copying of thin originals which results in the automatic removal of the prints from the apparatus.

If it is desired to move the lamps 19 simultaneously with the frame 7 said lamps may be provided on a frame that may be rigidly connected with the frame 7.

It is clear, that the driving mechanism for the frame 7 may be executed in another manner as described above. Said frame may e.g. be so hingedly suspended to a rod system that the frame may move completely with regard to the wall cooperating therewith and parallel to itself. In case it is desired to have the frame in a sloping position so as to enable the automatic removal of the prints said frame may cooperate with a sloping wall.

I claim:

1. A contact printing apparatus comprising a box having a top wall, a frame mounted in the box beneath the wall for vertical movement toward and away from the wall, a plate of transparent material carried by the frame and adapted to have the material to be copied and a light sensitive sheet superimposed thereon, means mounting the frame in the box for angular movement relative to the wall concurrently with the vertical movement toward and away from the wall so that the plate clamps the material and sheet against the underside surface of the wall and means operable externally of the box for operating the mounting means to move the frame, said means including two pairs of linkages connected to opposite sides of the frame and an operating shaft rotatably mounted on the box and to which the linkages are attached, one end of said linkages being pivotally connected to the frame in the region between the center and the forward end thereof, and an abutment underlying the rearward end of the frame to provide a stop for support of the frame when in its lower position.

2. An apparatus as claimed in claim 1, wherein said box has a sectional front wall, including an upper and a lower section, the lower section being fixed and the upper section being pivotally carried by the frame for vertical movement inside the lower section and for movement above the lower section to complete the front wall when the plate is in its uppermost position.

3. A contact printing apparatus according to claim 1, in which at least one spring is fixed at the rear end of the frame to urge said rear end away from the upper wall against the action of the operating means.

4. A contact printing apparatus according to claim 1 in which each of the front corners of the frame is hingedly connected to a link pivotally arranged in the box, said links carrying a plate forming a movable part of the front wall of the box.

5. A contact printing apparatus according to claim 1 in which each of the front corners of said frame are hingedly connected to a link pivotally arranged in the box, said links carrying a plate forming a movable part of the front wall of said box.

6. A contact printing apparatus according to claim 1 in which a light source is carried by the frame.

7. A contact printing apparatus comprising a housing having a top wall, a frame mounted within the housing for vertical movement between raised and lowered positions in a direction toward and away from the wall respectively, a flat plate of translucent material carried by the frame and adapted to have the material to be copied and a light sensitive sheet superimposed therein, means mounting the frame in the housing for angular movement relative to the wall between raised and lowered positions so that the plates clamp the materials and the sheet against the underside of the surface of the top wall when in raised position and means operable externally of the housing for operating the mounting means for moving the frame between raised and lowered positions of adjustment, said means comprising two pairs of linkages connected at two opposite sides of the frame and in which the means operable externally of the housing comprises a shaft rotatably mounted on the housing and to which the linkages are attached, said linkages being connected at one end to the frame intermediate one end of the frame and the center thereof, and an abutment underlying the other end of the frame in spaced relation with the top wall to provide a rest for the end portion of the frame when in lowered position and a resilient means operatively engaging the other end of the frame constantly to urge the end portion of the frame in the direction toward said abutment.

References Cited in the file of this patent

UNITED STATES PATENTS

| | | |
|---|---|---|
| 1,276,476 | Barrows | Aug. 20, 1918 |
| 1,602,051 | Sharp | Oct. 5, 1926 |
| 1,822,489 | Kanolt | Sept. 8, 1931 |
| 2,457,926 | Sardeson | Jan. 4, 1949 |
| 2,643,699 | Krueger | June 30, 1953 |
| 2,762,281 | Kleinstra | Sept. 11, 1956 |

FOREIGN PATENTS

| | | |
|---|---|---|
| 154,210 | Germany | Sept. 9, 1903 |
| 21,990 | Great Britain | of 1910 |
| 9,123 | Great Britain | of 1912 |
| 564,593 | Great Britain | Oct. 4, 1944 |